United States Patent [19]

Meier et al.

[11] Patent Number: 5,627,256

[45] Date of Patent: May 6, 1997

[54] POLYCARBONATES CONTAINING ARYL PHOSPHINES

[75] Inventors: Helmut-Martin Meier, Ratingen; Hartmut Löwer, Krefeld; Wolfgang Ebert, Krefeld; Claus Wulff, Krefeld, all of Germany

[73] Assignee: Bayer AG, Leverkusen, Germany

[21] Appl. No.: 570,399

[22] Filed: Dec. 11, 1995

[30] Foreign Application Priority Data

Dec. 21, 1994 [DE] Germany .......................... 44 45 786.3

[51] Int. Cl.[6] ...................................... C08G 64/00
[52] U.S. Cl. ......................... 528/198; 524/414; 525/461; 528/196

[58] Field of Search .............................. 524/414; 528/196, 528/198; 525/461

[56] References Cited

FOREIGN PATENT DOCUMENTS 0213413 3/1987 European Pat. Off. .
0559953 9/1993 European Pat. Off. .

*Primary Examiner*—Terressa Mosley
*Attorney, Agent, or Firm*—Connolly & Hutz

[57] ABSTRACT

The present invention relates to thermoplastic aromatic polycarbonates having a content of special aryl phosphines, to their preparation, and to their use in the light engineering sector and in optics.

20 Claims, No Drawings

POLYCARBONATES CONTAINING ARYL PHOSPHINES

The stabilization of special polycarbonates with triphenyl phosphine is known from EP 213 413. It is also known from EP 559 953 that phosphines can be used as heat stabilizers. It has now been shown that this can lead to the volatilization of triphenyl phosphine during the processing of polycarbonates, which can result in unwanted mould coatings occurring on the machinery in the long term.

The object of the present invention is thus to develop stabilizers which are less volatile and which exhibit improved stabilization behavior in polycarbonates.

Surprisingly, it has now been found that, by using special aryl phosphines which may also contain alkyl chains, it is possible to achieve good stabilization of polycarbonates and to reduce the volatility of the stabilizers, and thus clearly to surpass the prior art. This superiority compared with the known triphenyl phosphine stabilizers was unexpected.

The present invention therefore relates to thermoplastic aromatic polycarbonates having a content of phosphine stabilizers, which are characterized in that the phosphine stabilizers correspond to formula (I)

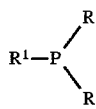   (I)

where R is an unsubstituted or substituted $C_6$–$C_{14}$ aryl radical and where $R^1$ is one of the following radicals (Ia) to (Ih):

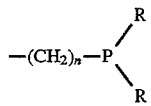   (Ia)

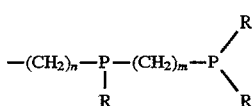   (Ib)

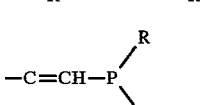   (Ic)

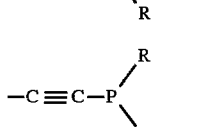   (Id)

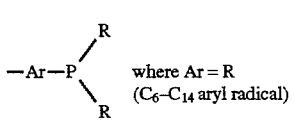   (Ie)

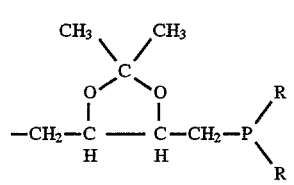   (If)

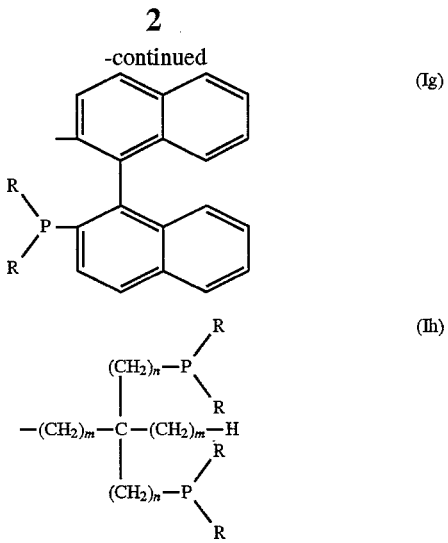

(Ig)

(Ih)

where R has the meaning cited for formula (I), "n" and "m" are each, independently of each other, an integer from 1 to 7, and where the H atoms of radicals (Ia) to (Ic) can also be replaced by substituents and where $R^1$ can also be 4-phenyl phenyl or α-naphthyl when both R's in formula (I) are likewise each 4-phenyl phenyl or α-naphthyl. In this respect, the 4-phenyl phenyl and the α-naphthyl radicals may also contain substituents.

The preferred radicals R in (I) are phenyl, 4-phenyl phenyl and naphthyl.

Suitable substituents of the aryl radicals R in (I) are F, $CH_3$, Cl, Br, I, $OCH_3$, CN, OH, alkylcarboxy, phenyl, cycloalkyl or alkyl.

Suitable substituents for the H atoms of radicals (Ia) to (Ic) are F, $CH_3$, alkyl, cycloalkyl, Cl, or aryl.

The preferred integers "n" and "m" are 1, 2, 3 or 4.

Examples of the phosphines of formula (I) to be used according to the invention include:

1,2-bis-(di-pentafluorophenyl-phosphino)-ethane,
bis-(diphenyl-phosphino)-acetylene,
1,2-bis-(diphenylphosphino)-benzene,

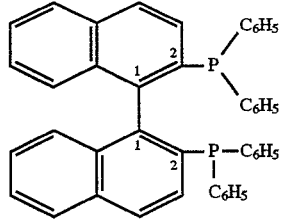

[2,2'-bis-(diphenylphosphino)-1,1'-binaphthyl],
2,3-bis-(diphenylphosphino)-butane,
1,4-bis-(diphenylphosphino)-butane,
1,2-bis-(diphenylphosphino)-ethane,
cis- 1,2-bis-(diphenylphosphino)-ethylene,

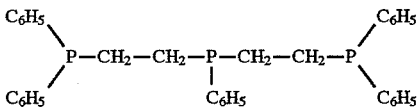

[bis-(2-(diphenylphosphino)-ethyl )-phenyl phosphine],
bis-(diphenylphosphino)-m ethane,
2,4-bis-(diphenylphosphino)-pentane, 1,3-bis-(diphenylphosphino)-propane,
1,2-bis-(diphenylphosphino)-propane,

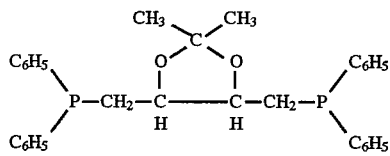

[4,5-O-isopropylidene-2,3-dihydroxy-1,4-bis-(diphenylphosphino)-butane],
tri-(4-diphenyl)-phosphine, and
tris-(α-naphthyl)-phosphine.

The compounds of formula (I) can be prepared according to the following literature references: Issleib et al., Chem. Ber. 92 (1959), 3175, 3179; and Hartmann et al., Zeitschr. Anorg. Ch. 287 (1956) 261,264.

Thermoplastic aromatic polycarbonates in the sense of the present invention comprise both polycarbonate homopolymers and polycarbonate copolymers; the polycarbonates may be linear or branched in the known manner.

Part of the carbonate groups, namely up to 80 mole %, preferably 20 mole % to 50 mole %, in the polycarbonates which are suitable according to the invention may be replaced by aromatic dicarboxylic acid ester groups. Polycarbonates of this type, which contain both acid radicals of carbonic acid and acid radicals of aromatic dicarboxylic acids incorporated into their molecular chain, are more accurately described as aromatic polyester carbonates. For the sake of simplicity, however, they are included under the generic term of thermoplastic aromatic, polycarbonates in the present application.

The polycarbonates to be used according to the invention are prepared in the known manner from diphenols, carbonic acid derivatives, optionally chain terminators and optionally branching agents, part of the carbonic acid derivatives being replaced by aromatic dicarboxylic acids or derivatives of dicarboxylic acids for the preparation of the polycarbonates, in accordance with the carbonate structural units to be replaced by aromatic dicarboxylic acid structural units in the aromatic polycarbonates in each case.

Details of the preparation of polycarbonates have been disclosed in hundreds of patent specifications over approximately the past 40 years. By way of example, reference is merely made here to "Schnell", Chemistry and Physics of Polycarbonates", Polymer Reviews, Volume 9, Interscience Publishers, New York, London, Sydney 1964; to D. C. PREVORSEK, B. T. DEBONA and Y. KESTEN, Corporate Research Center, Allied Chemical Corporation, Morristown, N.J. 07960, "Synthesis of Poly(ester Carbonate) Copolymers" in Journal of Polymer Science, Polymer Chemistry Edition, Vol. 19, 75–90 (1980); to D. Freitag, U. Grigo, P. R. Müller, N. Nonvertue, BAYER AG, "Polycarbonates" in the Encyclopedia of Polymer Science and Engineering, Volume 11, Second Edition, 1988, pages 648–718; and finally to Drs. U. Grigo, K. Kricher and P. R. Müller, "Polycarbonates" in Becker/Braun, Kunststoff-Handbuch [Plastics Handbook], Volume 3/1, Polycarbonates, Polyacetals, Polyesters, Cellulose Esters, Carl Hanser Verlag, Munich, Vienna 1992, pages 117–299.

The thermoplastic polycarbonates, including the thermoplastic aromatic polycarbonates, have average molecular weights $\overline{M}_w$ (determined by measuring the relative viscosity at 25° C. in $CH_2C_{12}$ at a concentration of 0.5 g per 100 ml $CH_2C_{12}$) of 12,000 to 120,000, preferably of 18,000 to 80,000, and in particular of 22,000 to 60,000.

Examples of suitable diphenols for preparing the polycarbonates to be used according to the invention include hydroquinone, resorcinol, dihydroxydiphenyl, bis-(hydroxyphenyl)-alkanes, bis(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxy-phenyl)-diisopropylbenzenes, and compounds thereof containing alkylated and halogenated nuclei.

Preferred diphenols comprise 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-pdiisopropylbenzene, 2,2-bis-(3-methyl-4-hydroxyphenyl)-propane, 2,2-bis-(3-chloro-4hydroxyphenyl)-propane, bis-(3,5-dimethyl-4-hydroxyphenyl)methane, 2,2-bis-(3,5dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols comprise 2,2-bis-(4-hydroxyphenyl)-propane, 2,2bis(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl) cyclohexane and 1,1-bis-(4-hydroxyphenyl)-3,3,5-trimethylcyclohexane.

These and other suitable diphenols are described, for example, in U.S. Pat. Nos. 3,028,635, 2,999,835, 3,148,172, 2,991,273, 3,271,367, 4,982,014 and 2,999,846, in German Offenlegungsschriften 1 570 703, 2 063 050, 2 036 052, 2 211 956 and 3 832 396, in French Patent Specification 1 561 518, in the monograph by H. Schnell, "Chemistry and Physics of Polycarbonates", Interscience Publishers, New York 1964" and in Japanese patents laid open to public inspection 62039/1986, 62040/1986 and 105550/1986.

Only one diphenol is used for polycarbonate homopolymers; a plurality of diphenols is used for polycarbonate copolymers.

Suitable chain terminators comprise both monophenols and monocarboxylic acids. Suitable monophenols comprise phenol itself, alkyl phenols such as cresols, p-tert.-butylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-tribromophenol.

Suitable monocarboxylic acids comprise benzoic acid, alkylbenzoic acids and halogenobenzoic acids.

Preferred chain terminators are phenols of formula (III)

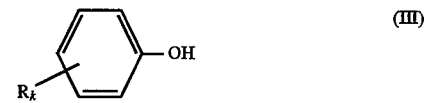

where $R_k$ is a branched or unbranched $C_8$ and/or $C_9$ alkyl radical.

The amount of chain terminator to be used is 0.5 mole % to 10 mole %, with respect to the moles of diphenols used in each case. The chain terminators may be added before, during or after phosgenation.

Suitable branching agents comprise the trifunctional compounds or the compounds with a functionality greater than three which are known in polycarbonate chemistry, particularly those containing three or more than three phenolic OH groups.

Examples of suitable branching agents include phloroglucine, 4,6-dimethyl-2,4,6-tri-(4hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)phenyl) orthoterephthalate, tetra-(4-hydroxyphenyl)-methane, tetra-(4-(4-hydroxyphenyl-isopropyl)-phenoxy)-methane and 1,4-bis(4',4"-dihydroxytriphenyl)-methyl)-benzene, as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents which are optionally used is 0.05 mole % to 2 mole %, again with respect to the moles of diphenols used each time.

The branching agents may either be added to the diphenols and chain terminators in the aqueous alkaline phase, or may be added, dissolved in an organic solvent, before phosgenation.

All these measures for the preparation of polycarbonates are familiar to one skilled in the art.

Examples of aromatic dicarboxylic acids which are suitable for preparing the polyester carbonates include ortho-phthalic acid, terephthalic acid, isophthalic acid, tert.-butyl isophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulphone dicarboxylic acid, 2,2-bis-(4-carboxyphenyl)-propane, and trimethyl-3-phenyl-indane-4,5 '-dicarboxylic acid.

Of the aromatic dicarboxylic acids, terephthalic acid and/or isophthalic acid are preferably used.

Derivatives of dicarboxylic acids comprise dicarboxylic acid dihalides and dicarboxylic acid dialkyl esters, particularly dicarboxylic acid dichlorides and dicarboxylic acid dimethyl esters.

Replacement of the carbonate groups by aromatic dicarboxylic acid ester groups is effected substantially stoichiometrically and also quantitatively, so that the molar ratio of reactants is also found again in the final polyester carbonate. The aromatic dicarboxylic acid ester groups can be incorporated both randomly and in blocks.

The preferred preparative procedures for the polycarbonates to be used according to the invention, including the polyester carbonates, are the known phase boundary process and the known melt transesterification process.

In the first case phosgene and optionally dicarboxylic acid dichlorides are preferably used as the acid derivatives; and in the second case diphenyl carbonate and optionally dicarboxylic acid diesters are preferably used. The catalysts, solvents, work-up and reaction conditions, etc., for the polycarbonate preparation or polyester carbonate preparation are sufficiently well known and described in both cases.

The amounts of stabilizers to be used are between 0.001 and 1% by weight, preferably between 0.002 and 0.5% by weight, and particularly between 0.005 and 0.2% by weight, in each case with respect to the total weight of thermoplastic polycarbonate and stabilizer.

Incorporation of the phosphine stabilizer into the thermoplastic aromatic polycarbonates is advantageously effected during the preparation of the polycarbonate. In this respect, the phosphine can be added continuously by means of a suitable feed pump during the final phase of preparation, in which the molten polycarbonate is continuously freed from solvent in a feed screw under vacuum. It is also possible, of course, to stabilize the polycarbonate after its preparation with the phosphine by what is termed compounding; this method is described in the examples of this application. In this procedure the phosphine is mixed, undiluted or in solution, with the polycarbonate and is compounded at 270° C. in a ZSK 32 extruder.

Thus the present invention also relates to a method of preparing stabilized thermoplastic aromatic polycarbonates, which is characterized in that phosphines of formula (I) are mixed, undiluted or in solution, with the polycarbonate during the preparation or after the preparation of the thermoplastic polycarbonate and are compounded in an extruder.

The polycarbonates which are stabilized according to the invention are used in particular in applications where the mouldings produced are subjected to a high thermal loading for an extended period, and moreover for all articles for which high transparency is required. This preferably applies to their use in the lighting engineering sector, e.g. for lamp covers, or to glazing units with polycarbonate sheets, or for optical applications such as spectacles and compact discs.

Thus the present invention also relates to the use of the polycarbonates stabilized according to the invention for the production of lamp covers, glazing units, spectacles or compact discs.

The parts given in the examples are parts by weight.

The thermoplastic polycarbonates which are stabilized according to the invention may also be mixed in the known manner with other thermoplastic materials, for example with ABS polymers, polystyrenes, polyalkylene terephthalates or polyarylene sulphones.

Preparation of a Polycarbonate 454 parts of 2,2-bis-(p-hydroxyphenyl)-propane and 2.5 parts of p-tert.-butylphenol were suspended in 1.5 l of water in a three-necked flask fitted with a stirrer and a glass inlet tube, and the oxygen was then removed from the reaction mixture by passing nitrogen through the reaction mixture for 15 minutes with stirring. 355 parts of 45% sodium hydroxide solution and 1000 parts of methylene chloride were then added. The mixture was cooled to 25° C. This temperature was maintained by cooling whilst 237 parts of phosgene were added over a period of 120 minutes. An additional amount of 75 parts of a 45% sodium hydroxide solution was added after 15 to 30 minutes, or after the absorption of phosgene had commenced. 1.6 parts of triethylamine were added to the solution formed, and the mixture was stirred for a further 15 minutes. A highly viscous solution was obtained, the viscosity of which was regulated by the addition of methylene chloride. The aqueous phase was separated off. The organic phase was washed with water until it was free from salt and alkali. The polycarbonate was isolated from the washed solution and dried. The polycarbonate had a relative viscosity of 1.29 to 1.30, measured in a 0.5% solution in methylene chloride at 20° C. This approximately corresponded to a molecular weight of 32,000. The polycarbonate obtained in this manner was extruded and granulated.

I. PREPARATION OF STABILIZED POLYCARBONATED

The above polycarbonate with a relative viscosity of 1.295 was compounded with the stabilizers listed in the examples in a ZSK 32 extruder at 270° C. The products were injection moulded at 300° C. to produce small standard bars. For comparison, the unstabilized polycarbonate was also extruded once at 270° C. Its relative viscosity fell to 1.289 at this temperature.

II. PREPARATION OF SPECIAL PHOSPHINES

Example 1

1,2-bis-(diphenylphosphino)-ethane was prepared from diphenylchlorophosphine and 1,2-dichloroethane in the presence of sodium by the method of Issleib et al. (see above for the literature reference), and was incorporated in polycarbonate in an amount of 0.1%.

Example 2

1,4-bis-(diphenylphosphino)-butane was prepared from diphenylchlorophosphine and 1,4-dichlorobutane in the presence of sodium by the method of Issleib et al. (see above for the literature reference), and was incorporated in polycarbonate in an amount of 0.1%.

III. COMPARISON EXAMPLES

Comparison Example 1

A polycarbonate which contained no stabilizer and which was processed as described above.

Comparison Example 2 (EP 559 593)

A polycarbonate which contained 0.1% Irgafos PEPQ (Ciba Geigy)

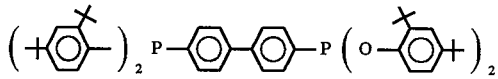

and which was processed as described above.

Comparison Example 3 (EP 213 413)

A polycarbonate which contained 0.1% triphenyl phosphine (Techno Chemie) and which was processed as described above.

IV. RESULTS

Thermal Ageing

The test specimens prepared in the manner described above were annealed in a drying oven at 140° C. The increase in the yellowness index (Y.I.) in the course of heat treatment in each case, measured according to ASTM 1925, served as a measure of the increasing degree of brown coloration of the test specimens.

Hydrolysis Test

A number of test specimens was stored in distilled water at 100° C. After defined time intervals had elapsed, 10 test specimens were withdrawn each time and the relative viscosity $\eta_{rel}$ resulting from this treatment was measured (as a 0.5% by weight solution in methylene chloride at 25° C.). The decrease in $n_{rel}$ is a measure of the increasing hydrolysis during the storage in water. The mean values of 10 individual measurements are listed in the following Table.

|  | Time (hours) | Y.I. | $\eta_{rel}$ |
|---|---|---|---|
| Example 1 | 0 | 4.4 | 1.287 |
|  | 1000 | 8.0 | 1.240 |
| Example 2 | 0 | 4.5 | 1.282 |
|  | 1000 | 8.6 | 1.150 |
| Comparison 1 | 0 | 6.6 | 1.289 |
|  | 1000 | 12.3 | 1.228 |
| Comparison 2 | 0 | 5.2 | 1.285 |
|  | 1000 | 12.0 | 1.244 |
| Comparison 3 | 0 | 5.0 | 1.289 |
|  | 1000 | 11.7 | 1.248 |

We claim:
1. Thermoplastic aromatic polycarbonates having a content of phosphine stabilizers, wherein the phosphine stabilizers correspond to formula (I)

where R is an unsubstituted or substituted $C_6$–$C_{14}$ aryl radical, and where $R^1$ is one of the following radicals (Ia) to (Ih):

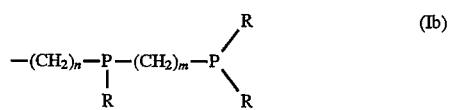

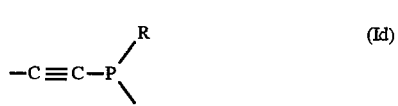

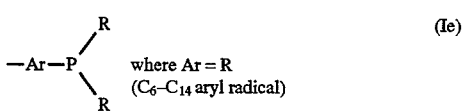

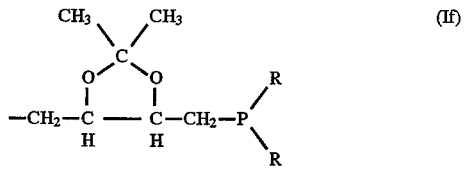

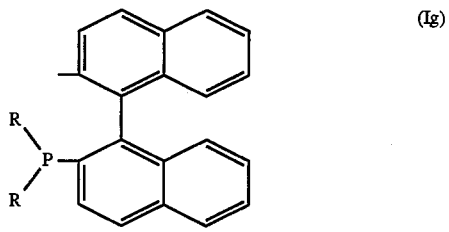

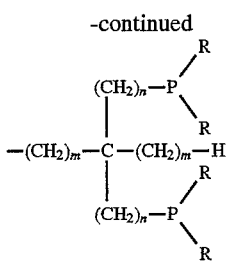

where R has the meaning cited for formula (I), "n" and "m" are each, independently of each other, an integer from 1 to 7, and where the H atoms of radicals (Ia) to (Ic) can also be replaced by substituents and where $R^1$ can also be 4-phenyl phenyl or α-naphthyl when both R's in formula (I) are likewise each 4-phenyl phenyl or α-naphthyl, further wherein the content of the phosphine stabilizers of formula (I) is between 0.001% by weight and 1% by weight with respect to the total weight of the polycarbonate and phosphine stabilizers.

2. Polycarbonates according to claim 1, wherein the content of said phosphine stabilizers is between 0.002% by weight and 0.5% by weight.

3. Polycarbonates according to claim 1, wherein the content of said phosphine stabilizers is between 0.005% by weight and 0.2% by weight.

4. A method of preparing the polycarbonates of claim 1, wherein the phosphine stabilizers of formula (I) are mixed with the polycarbonate while the polycarbonate is molten.

5. Polycarbonates according to claim 1, characterized in that tris-(4-diphenyl)-phosphine or tris-(α-naphthyl)-phosphine is used as the phosphine of formula (I).

6. A method of preparing the polycarbonates of claim 1, wherein the phosphine stabilizers of formula (I) are mixed, undiluted or in solution, with the polycarbonate after the preparation of the polycarbonate.

7. The method of claim 6, wherein the phosphine stabilizers are mixed with the polycarbonate by compounding the phosphine stabilizers and the polycarbonate in an extruder.

8. The method of claim 7, wherein the phosphine stabilizers and the polycarbonate are compounded in the extruder at 270° C.

9. Polycarbonates according to claim 1, wherein said phosphine stabilizers consist of at least one phosphine compound selected from the group consisting of 1,2-bis-(dipentafluorophenylphosphino)-ethane, bis-(diphenylphosphino)-acetylene, 1,2-bis-(diphenylphosphino)-benzene, 2,2'-bis-(diphenylphosphino)-1,1'-binaphthyl, 2,3-bis-(diphenylphosphino)-butane, 1,4-bis(diphenylphosphino)-butane, 1,2-bis-(diphenylphosphino)-ethane, cis-1,2-bis-(diphenylphosphino)-ethylene, bis-(2-diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino)-propane, 4,5-O-isopropylidene-2,3-dihydroxy-1,4-bis-(diphenylphosphino)-butane, tri-(4-diphenyl)-phosphine and tris-(α-naphthyl)-phosphine.

10. The method of claim 4, wherein said phosphine stabilizers consist of at least one phosphine compound selected from the group consisting of 1,2-bis-(dipentafluorophenyl-phosphino)-ethane, bis-(diphenylphosphino)-acetylene, 1,2-bis-(diphenylphosphino)-benzene, 2,2'-bis-(diphenylphosphino)-1,1'-binaphthyl, 2,3-bis-(diphenylphosphino)-butane, 1,4-bis-(diphenylphosphino)-butane, 1,2-bis-(diphenylphosphino)-ethane, cis-1,2-bis-(diphenylphosphino) ethylene, bis-(2-(diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino) propane, 4,5-O-isopropylidene-2,3-dihydroxy-1,4-bis-(diphenylphosphino)-butane, tri-(4-diphenyl)-phosphine and tris-(α-naphthyl)-phosphine.

11. The method of claim 6, wherein said phosphine stabilizers consist of at least one phosphine compound selected from the group consisting of 1,2-bis-(dipentafluorophenyl-phosphino)-ethane, bis-(diphenylphosphino)-acetylene, 1,2-bis-(diphenylphosphino)-benzene, 2,2'-bis-(diphenylphosphino)-1,1'-binaphthyl, 2,3-bis-(diphenylphosphino)-butane, 1,4-bis-(diphenylphosphino)-butane, 1,2-bis-(diphenylphosphino)-ethane, cis-1,2-bis-(diphenylphosphino)-ethylene, bis-(2-(diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino)-propane, 4,5-O-isopropylidene-2,3-dihydroxy-1,4-bis-(diphenylphosphino)-butane, tri-(4-diphenyl)-phosphine and tris-(α-naphthyl)-phosphine.

12. A thermoplastic aromatic polycarbonate containing a phosphine stabilizer, wherein the phosphine stabilizer corresponds to formula (I)

where R is an unsubstituted or substituted $C_6$–$C_4$ aryl radical, and where $R^1$ is one of the following radicals (Ia) to (Ih):

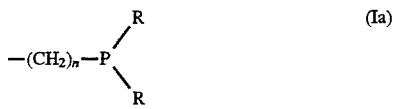

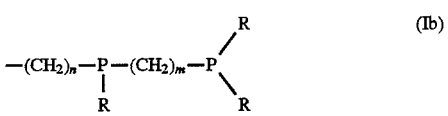

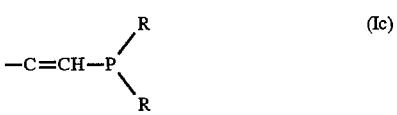

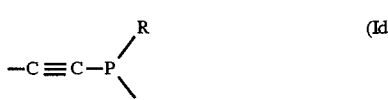

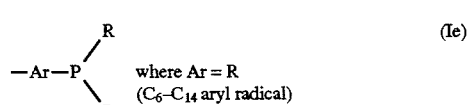

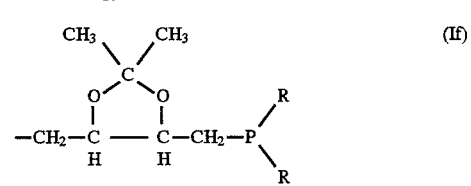

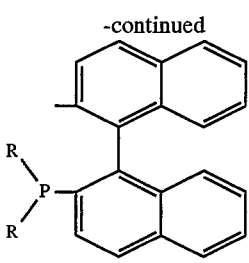

(Ig)

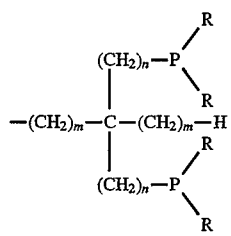

(Ih)

where R has the meaning cited for formula (I), "n" and "m" are each, independently of each other, an integer from 1 to 7, and where the H atoms of radicals (Ia) to (Ic) can also be replaced by substituents and where $R^1$ can also be 4-phenyl phenyl or α-naphthyl when both R's in formula (I) are likewise each 4-phenyl phenyl or α-naphthyl, further wherein the content of the phosphine stabilizer of formula (I) is between 0.001% by weight and 1% by weight with respect to the total weight of the polycarbonate and phosphine stabilizer.

13. A method of preparing the polycarbonate of claim 12, wherein the phosphine stabilizer of formula (I) is mixed with the polycarbonate while the polycarbonate is molten.

14. A method of preparing the polycarbonate of claim 12, wherein the phosphine stabilizer of formula (I) is mixed, undiluted or in solution, with the polycarbonate after the preparation of the polycarbonate.

15. A polycarbonate according to claim 14, wherein said phosphine stabilizer is selected from the group consisting of 1,2-bis-(di-pentafluorophenyl-phosphino)-ethane, bis-(diphenyl-phosphino)-acetylene, 1,2-bis-(diphenylphosphino)-benzene, 2,2'-bis-(diphenylphosphino)-1,1'-binaphthyl, 2,3-bis-(diphenylphosphino)-butane-1,4-bis-(diphenylphosphino)-butane, 1,2-bis-(diphenylphosphino)-ethane, cis-1,2-bis-(diphenylphosphino)-ethylene, bis-(2-(diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino)-propane, 4,5-O-isopropylidene-2,3-dihydroxy-1,4-bis-(diphenylphosphino)-butane, tri-(4-diphenyl)-phosphine and tris-(α-naphthyl)-phosphine.

16. A polycarbonate according to claim 12, wherein the content of said phosphine stabilizer is between 0.002% by weight and 0.5% by weight.

17. A polycarbonate according to claim 12, wherein the content of said phosphine stabilizer is between 0.005% by weight and 0.2% by weight.

18. The method of claim 14, wherein the phosphine stabilizer is mixed with the polycarbonate by compounding the phosphine stabilizer and the polycarbonate in an extruder.

19. A polycarbonate according to claim 13, wherein said phosphine stabilizer is selected from the group consisting of 1,2-bis-(di-pentafluorophenyl-phosphino)-ethane, bis-(diphenyl-phosphino)-acetylene, 1,2-bis-(diphenylphosphino)-benzene, 2,2'-bis-(diphenylphosphino)-1,1'-binaphthyl, 2,3-bis-(diphenylphosphino)-butane, 1,4-bis-(diphenylphosphino)-butane, 1,2-bis-(diphenylphosphino)-ethane, cis-1,2-bis-(diphenylphosphino)-ethylene, bis-(2-(diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino)-propane, 4,5-O-isopropylidene-2,3-dihydroxy-1,4-bis-(diphenylphosphino)-butane, tri-(4-diphenyl)-phosphine and tris-(α-naphthyl)-phosphine.

20. A polycarbonate according to claim 14, wherein said phosphine stabilizer is selected from the group consisting of 1,2-bis-(di-pentafluorophenyl-phosphino)-ethane, bis-(diphenylphosphino)-acetylene, 1,2-bis-(diphenylphosphino)-benzene, 2,2'-bis-(diphenylphosphino)-1,1'-binaphthyl, 2,3-bis-(diphenylphosphino)-butane, 1,4-bis-(diphenylphosphino)-butane, 1,2-bis-(diphenylphosphino)-ethane, cis-1,2-bis-(diphenylphosphino)-ethylene, bis-(2-(diphenylphosphino)-ethyl)-phenylphosphine, bis-(diphenylphosphino)-methane, 2,4-bis-(diphenylphosphino)-pentane, 1,3-bis-(diphenylphosphino)-propane, 1,2-bis-(diphenylphosphino)-propane, 4,5-O-isopropylidene-2,3-dihydroxy-1,4-bis-(diphenylphosphino)-butane, tri-(4-diphenyl)-phosphine and tris-(α-naphthyl)-phosphine.

* * * * *

UNITED STATES PATENT AND TRADEMARK OFFICE
CERTIFICATE OF CORRECTION

PATENT NO. : 5,627,256
DATED : May 6, 1997
INVENTOR(S) : Helmut-Martin Meier, et al.

It is certified that error appears in the above-identified patent and that said Letters Patent is hereby corrected as shown below:

In Column 10, line 34 (Claim 12), "$C_6$-$C_4$" should be --$C_6$-$C_{14}$--.

Signed and Sealed this

Second Day of December, 1997

BRUCE LEHMAN

Attest:

Attesting Officer

Commissioner of Patents and Trademarks